United States Patent [19]
Katsuma

[11] Patent Number: 6,166,854
[45] Date of Patent: Dec. 26, 2000

[54] DIFFRACTION TYPE FILTER HAVING AN ABERRATION CORRECTION FUNCTION AND WAVE LENGTH SELECTIVITY

[75] Inventor: Toshiaki Katsuma, Omiya, Japan

[73] Assignee: Fuji Photo Optical Co., Ltd., Saitama, Japan

[21] Appl. No.: 09/209,421

[22] Filed: Dec. 11, 1998

[30] Foreign Application Priority Data

Dec. 26, 1997 [JP] Japan ................................. 9-369589

[51] Int. Cl.[7] ............................. G02B 5/18; G02B 27/44; G11B 7/00
[52] U.S. Cl. .......................... 359/569; 359/565; 359/566; 359/571; 369/112
[58] Field of Search .................................. 359/558, 562, 359/565, 566, 568, 569, 571, 574; 369/44.37, 112

[56] References Cited

U.S. PATENT DOCUMENTS

| | | | |
|---|---|---|---|
| 5,161,040 | 11/1992 | Yokoyama et al. | 359/565 |
| 5,360,973 | 11/1994 | Webb | 359/565 |
| 5,682,265 | 10/1997 | Farn et al. | 359/569 |
| 5,696,750 | 12/1997 | Katayama | 369/112 |
| 5,815,293 | 9/1998 | Komma et al. | 359/569 |
| 5,880,879 | 3/1999 | Foo | 359/565 |

*Primary Examiner*—Cassandra Spyrou
*Assistant Examiner*—Jennifer Winstedt
*Attorney, Agent, or Firm*—Snider & Associates; Ronald R. Snider

[57] ABSTRACT

A zone plate having an aberration correcting function in a wavelength selecting manner and a diffraction grating substantially having a light shielding function in a wavelength selecting manner are formed, respectively, in a center region and a marginal region of a filter, whereby only a predetermined wavelength of light is converged or diverged by the zone plate and is diffracted sideways by the diffraction grating, whereby the luminous flux diameter of the irradiation light is changed while the aberration caused by a convergent lens is favorably corrected. The diffraction type filter 8A is constituted by a first region 11 comprising a central circular portion and a second region 12 comprising a marginal portion thereof. The first region 11 is provided with a zone plate 11A (diffraction grating formed like concentric circles) having such a wavelength selectivity that light at a wavelength of 635 nm is transmitted therethrough as it is and that light at a wavelength of 780 nm is converged thereby. The second region 12 is provided with a diffraction grating 12A having such a wavelength selectivity that light at a wavelength of 635 nm is transmitted therethrough as it is and that a major part of light at a wavelength of 780 nm is diffracted sideways so as to be substantially blocked out.

20 Claims, 9 Drawing Sheets

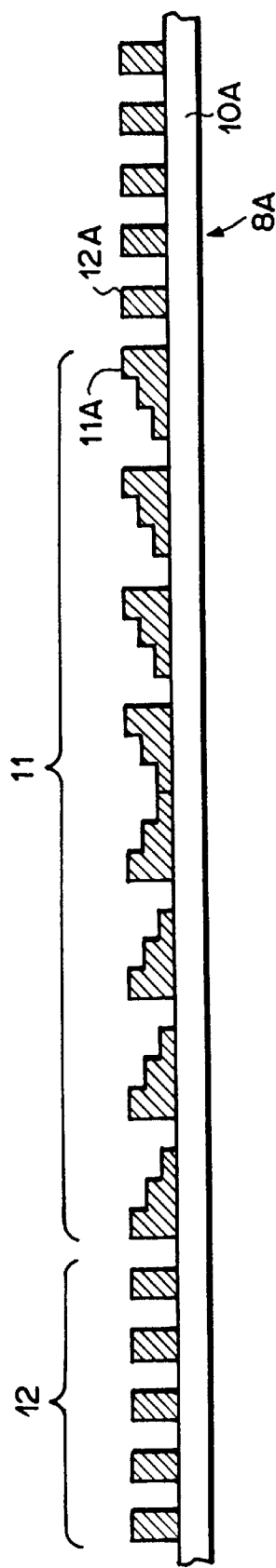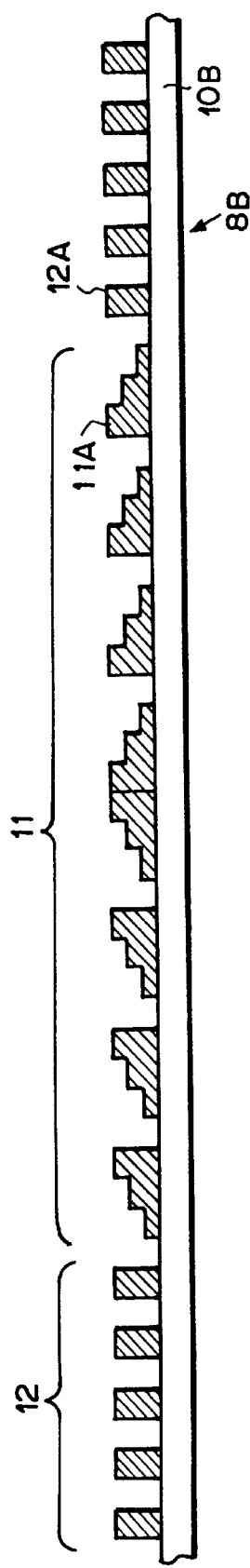

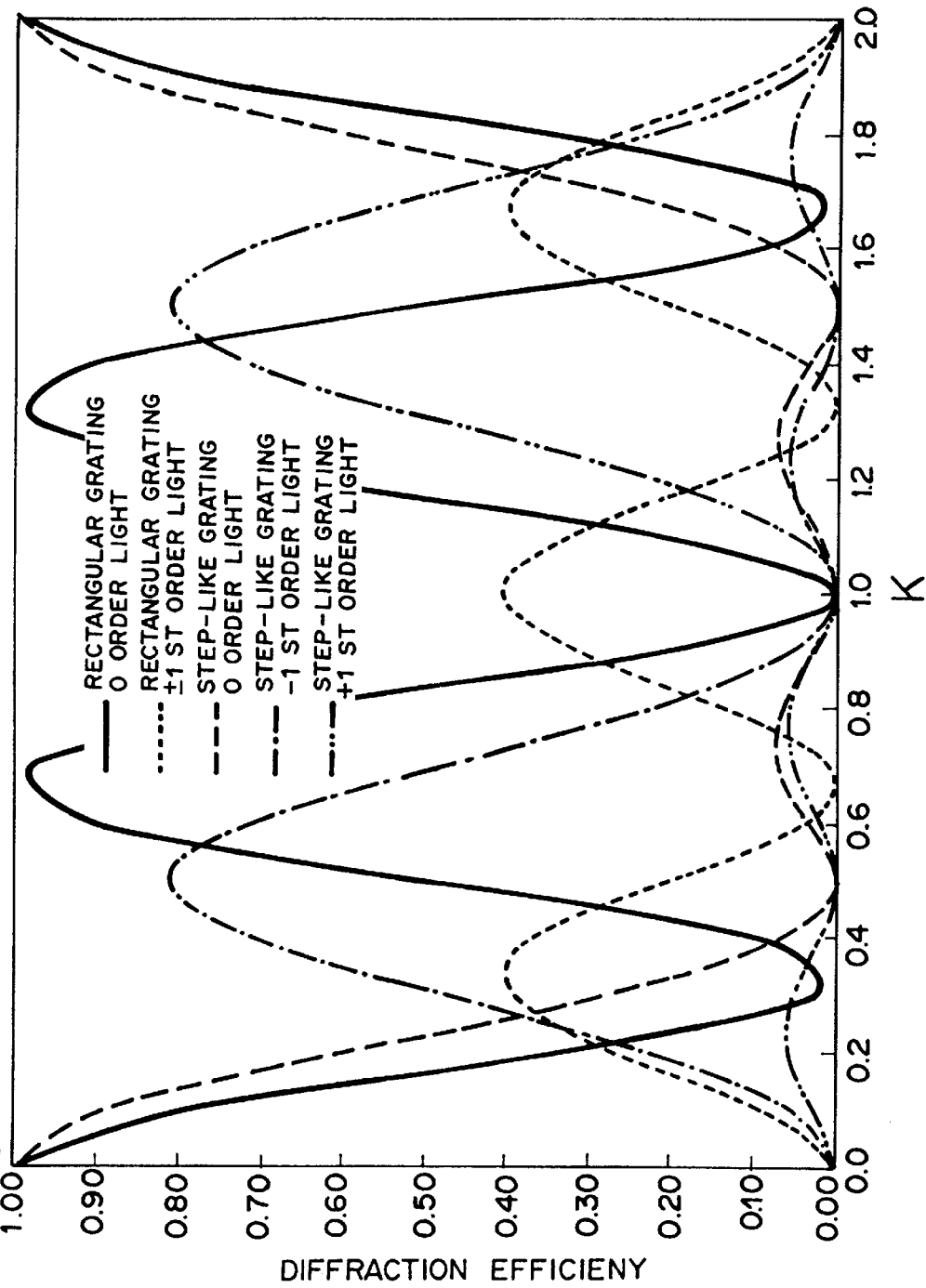

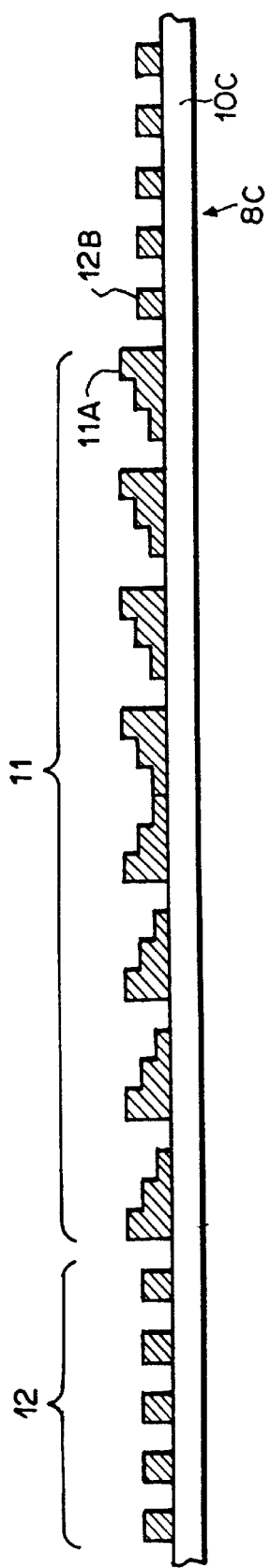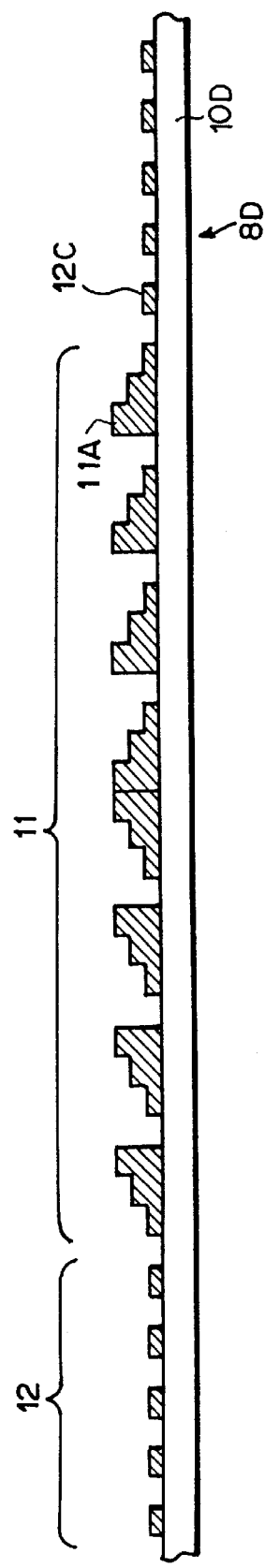

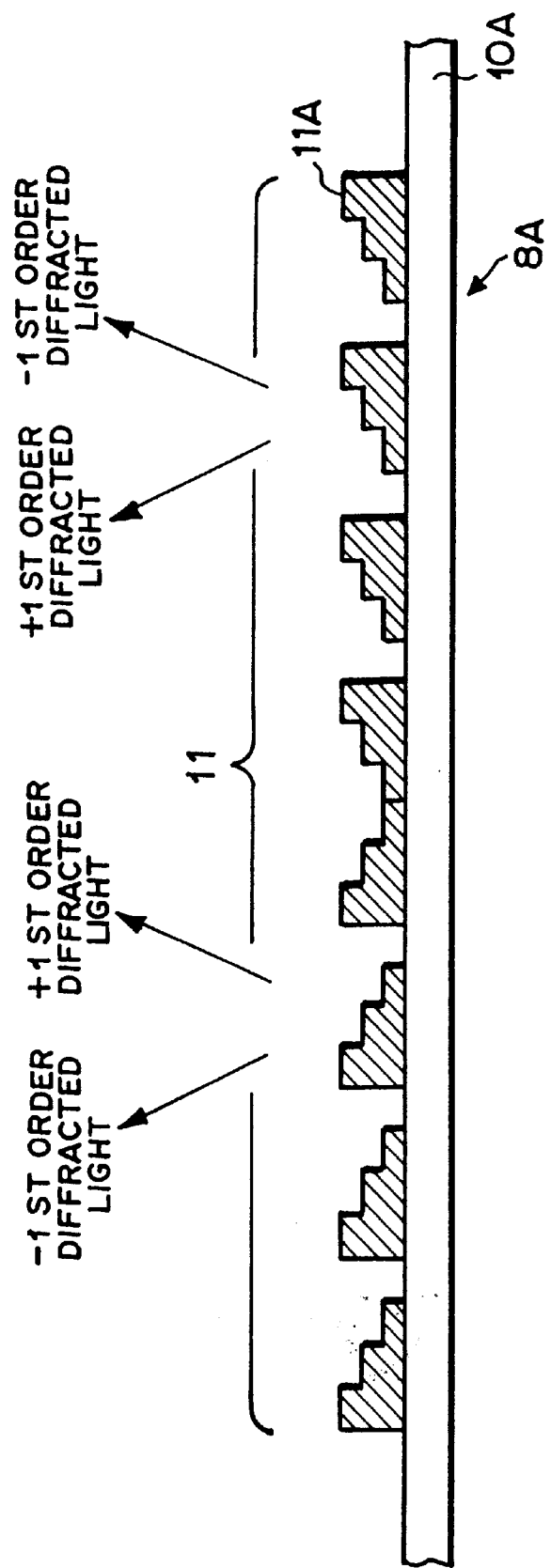

DIFFRACTION TYPE FILTER HAVING AN ABERRATION CORRECTION FUNCTION AND WAVE LENGTH SELECTIVITY

RELATED APPLICATIONS

This application claims the priority of Japanese Patent Application No. 9-369589 filed on Dec. 26, 1997, which is incorporated herein by reference.

BACKGROUND OF THE INVENTION

1. Field of the Invention

The present invention relates to a diffraction type filter used in an optical pickup apparatus which is commonly usable for two or more kinds of optical recording media. In the case where the optical recording media are irradiated with light beams having wavelengths different from each other depending on the kinds of optical recording media, the diffraction type filter can efficiently converge the light beams onto their corresponding optical recording media.

2. Description of the Prior Art

Recently, a variety of optical recording media have been under development, and optical pickup apparatus which can record and reproduce a plurality of kinds of optical recording, media in common have been known.

For example, an optical pickup apparatus may be used for recording and reproducing both DVD (digital video disk) and CD-R (write-once optical disk). In this case, the value of numerical aperture NA for each recording medium is defined according to a standard, such that brightness is necessary for the numerical aperture for DVD, which is 0.6, for example, whereas brightness is suppressed in the numerical aperture for CD-R, which is 0.45, for example.

As a consequence, when an objective lens is to be used for recording and reproducing both of the above-mentioned media, it becomes necessary to switch the numerical aperture of the pickup optical system between their recording/reproducing operations.

Typically, the size of numerical aperture is switched by changing the luminous flux diameter. For example, a liquid crystal shutter may be driven in synchronization with the timing at which the recording/reproducing operations for both media are switched, so as to change the diameter of the luminous flux passing through the shutter.

When a liquid crystal shutter is used for changing the luminous flux diameter, an electric control system is needed for controlling the liquid crystal shutter, thereby increasing the manufacturing cost.

Also, since only a polarized light component having a predetermined direction of vibration can pass through the liquid crystal shutter, it is necessary to carry out designing in view of the direction of vibration of the irradiation light in order for the light to efficiently pass therethrough, whereby the degree of flexibility in designing is restricted.

In the above-mentioned two kinds of optical recording media, while visible light at about 635 nm, for example, is employed for DVD in order to improve its recording density, near infrared light at about 780 nm is needed for CD-R since it has no sensitivity to light in the visible region. As a consequence, an optical pickup apparatus which can commonly be used for both of them would be of a so-called two-wavelength beam system using two different wavelengths of light as the irradiation light. Hence, the luminous flux diameters of these two kinds of irradiation light may be changed by means of their difference in wavelength.

Also, in the case where a pickup optical system is commonly used for optical recording media whose substrates have thicknesses different from each other as in the case of the above-mentioned DVD and CD-R, spherical aberration may occur when an objective lens designed for one of the optical recording media is used for the other optical recording medium, thus making it difficult to record/reproduce signals.

SUMMARY OF THE INVENTION

In view of the circumstances mentioned above, it is an object of the present invention to provide a diffraction type filter having a simple configuration and yielding less noise, which can change the luminous flux diameter of irradiation light without complicating its electric control system or restricting the direction of vibration of the irradiation light, and can eliminate influences of spherical aberration and the like even when an objective lens is commonly used for recording/reproducing at least two kinds of optical recording media whose substrates have thicknesses different from each other.

The diffraction type filter in accordance with one aspect of the present invention is a diffraction type filter, having a wavelength selectivity, disposed in a luminous flux; the filter comprising a first region constituting a center portion of the filter, and a second region positioned outside the center portion of the filter, the first region being formed with a zone plate having an aberration correcting function for only one of two light beams respectively having wavelengths of $\lambda_1$ and $\lambda_2$ which are different from each other, the second region being formed with a diffraction grating substantially having a light shielding function for only one of the two light beams respectively having wavelengths of $\lambda_1$ and $\lambda_2$.

Here, "substantially having a light shielding function" refers to diffracting incident light so that the light would not effectively contribute to recording/reproducing in a predetermined recording area.

Preferably, the diffraction grating is constituted by a plurality of protrusions, each having a height corresponding to the height 3 h of three stages of a step portion forming the zone plate, the height h of one stage of the step portion satisfying the following conditional expressions (1) and (2):

$$h = L\lambda_1/(n_1 - 1) \tag{1}$$

$$h = M\lambda_2/(n_2 - 1) + K\lambda_2/2(n_2 - 1) \tag{2}$$

where $\lambda_1$ and $\lambda_2$ are the respective wavelengths of the two incident light beams;

$n_1$ is the refractive index of the zone plate or diffraction grating with respect to light having a wavelength of $\lambda_1$;

$n_2$ is the refractive index of the zone plate or diffraction grating with respect to light having a wavelength of $\lambda_2$;

L is a positive integer;

M is the maximum value among 0 and positive integers satisfying a conditional expression of $h > M\lambda_2/(n_2 - 1)$; and K is a value at least 0.27 but not greater than 0.45 or a value at least 1.55 but not greater than 1.73.

The diffraction type filter in accordance with another aspect of the present invention is a diffraction type filter, having a wavelength selectivity, disposed in a luminous flux; the filter comprising a first region constituting a center portion of the filter, and a second region positioned outside the center portion of the filter, the first region being formed with a zone plate having an aberration correcting function for only one of two light beams respectively having wavelengths of $\lambda_1$ and $\lambda_2$ which are different from each other, the second region being formed with a diffraction grating substantially having a light shielding function for only one of the two light beams respectively having wavelengths of $\lambda_1$ and $\lambda_2$;

the diffraction grating being constituted by a plurality of protrusions, each having a height corresponding to the height 2 h of two stages of a step portion forming the zone plate, the height h of one stage of the step portion satisfying the following conditional expressions (3) and (4):

$$h=L\lambda_1/(n_1-1) \qquad (3)$$

$$h=M\lambda_2/(n_2-1)+K\lambda_2/2(n_2-1) \qquad (4)$$

where $\lambda_1$ and $\lambda_2$ are the respective wavelengths of the two incident light beams;

$n_1$ is the refractive index of the zone plate or diffraction grating with respect to light having a wavelength of $\lambda_1$;

$n_2$ is the refractive index of the zone plate or diffraction grating with respect to light having a wavelength of $\lambda_2$;

L is a positive integer;

M is the maximum value among 0 and positive integers satisfying a conditional expression of $h>M\lambda_2/(n_2-1)$; and K is a value at least 0.32 but not greater than 0.68 or a value at least 1.32 but not greater than 1.68.

The diffraction type filter in accordance with still another aspect of the present invention is a diffraction type filter, having a wavelength selectivity, disposed in a luminous flux; the filter comprising a first region constituting a center portion of the filter, and a second region positioned outside the center portion of the filter, the first region being formed with a zone plate having an aberration correcting function for only one of two light beams respectively having wavelengths of $\lambda_1$ and $\lambda_2$ which are different from each other, the second region being formed with a diffraction grating substantially having a light shielding function for only one of the two light beams respectively having wavelengths of $\lambda_1$ and $\lambda_2$;

the diffraction grating being constituted by a plurality of protrusions, each having a height corresponding to the height h of one stage of a step portion forming the zone plate, the height h of one stage of the step portion satisfying the following conditional expressions (5) and (6):

$$h=L\lambda_1/(n_1-1) \qquad (5)$$

$$h=M\lambda_2/(n_2-1)+K\lambda_2/2(n_2-1) \qquad (6)$$

where $\lambda_1$ and $\lambda_2$ are the respective wavelengths of the two incident light beams;

$n_1$ is the refractive index of the zone plate or diffraction grating with respect to light having a wavelength of $\lambda_1$;

$n_2$ is the refractive index of the zone plate or diffraction grating with respect to light having a wavelength of $\lambda_2$;

L is a positive integer;

M is the maximum value among 0 and positive integers satisfying a conditional expression of $h>M\lambda_2/(n_2-1)$; and K is a value at least 0.64 but not greater than 0.77 or a value at least 1.23 but not greater than 1.36.

Preferably, the luminous flux incident on the diffraction type filter is substantially a parallel luminous flux.

Preferably, the zone plate is constituted by a plurality of continuous protrusions arranged like concentric circles, each protrusion being continuous and having one sectional side formed like a step.

Preferably, the zone plate is a Fresnel zone plate, m-th radius $R_m$ of the zone plate being represented by the following conditional expression (7):

$$R_m=[\lambda_1 m(2f+\lambda_i m)]^{1/2} \qquad (7)$$

where m=0, 1, 2, . . . , n;

$\lambda_i$ is $\lambda_1$ or $\lambda_2$;

f is the focal length of the zone plate; and n is the number satisfying a conditional expression of $R_n=(½)\phi$ ($\phi$ being the beam diameter of a light beam effectively contributing to recording/reproducing in light whose aberration is corrected by the zone plate.)

Preferably, the number of stages in the step portion forming the zone plate is 3.

Here, the number of stages refers to the total number counting the uppermost and intermediate stages without including the surface on the filter substrate.

The diffraction type filter may be disposed in front of a convergent lens for converging the luminous flux.

The diffraction type filter may be configured such that the luminous flux is converged at a position where at least two kinds of optical recording media are placed, at least one of at least two kinds of optical media is recorded or reproduced with the light beam having a wavelength of $\lambda_1$, the rest is recorded or reproduced with the light beam having a wavelength of $\lambda_2$ different from the wavelength of $\lambda_1$, the zone plate corrects an aberration caused by a difference in thickness between the optical recording media for only one of the two light beams having different wavelengths, and the diffraction grating diffracts only one of the two light beams having different wavelengths into a direction different from the light-converging direction of the convergent lens.

BRIEF DESCRIPTION OF THE DRAWINGS

FIG. 3 is a sectional view showing the form of the diffraction type filter shown in FIG. 1;

FIG. 4 is a sectional view showing the form of the diffraction type filter in which a part of the diffraction type filter shown in FIG. 3 is modified;

FIG. 6 is a graph showing the diffraction efficiency of the diffraction type filter shown in FIG. 3;

FIG. 7 is a sectional view showing a diffraction type filter in accordance with a second embodiment of the present invention;

FIG. 9 is a sectional view showing a diffraction type filter in accordance with a third embodiment of the present invention;

FIG. 12 is a schematic view for defining +1st-order diffracted light and −1st-order diffracted light in the embodiments of the present invention.

DESCRIPTION OF THE PREFERRED EMBODIMENTS

In the following, embodiments of the present invention will be explained with reference to the accompanying drawings.

Figure 11:
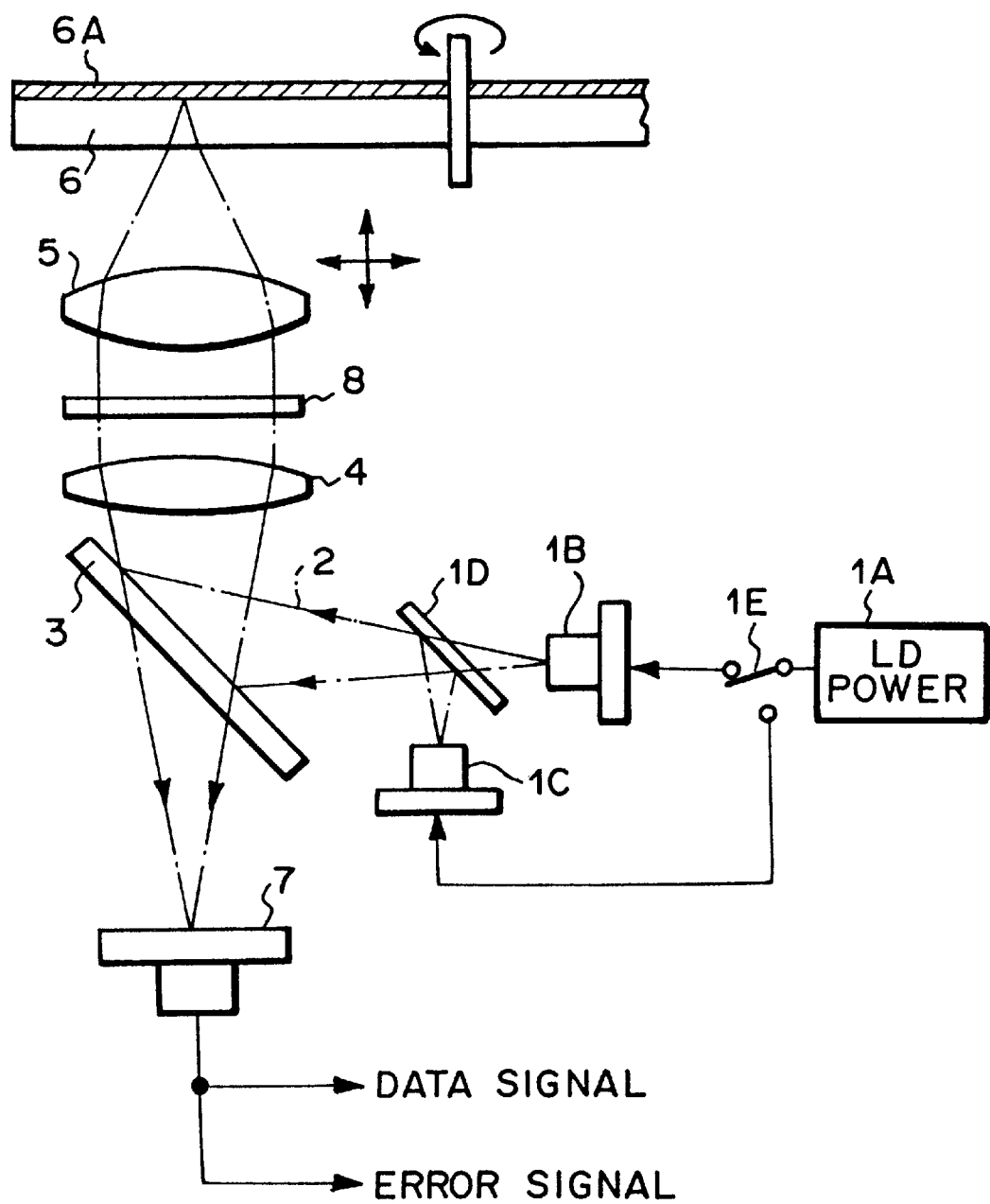
FIG. 11 is a schematic view showing an optical pickup apparatus employing the diffraction type filter in accordance with the embodiments of the present invention.

First, an optical pickup apparatus employing a diffraction type filter in accordance with embodiments of the present invention will be explained with reference to FIG. 11.

In this optical pickup apparatus, laser light beams 2 emitted from semiconductor lasers 1B and 1C when electric power is supplied thereto from an LD power supply 1A are reflected by a half mirror 3, are turned into parallel light by a collimator lens 4, and then are changed into convergent light by an objective lens 5 so as to irradiate a recording area 6A of an optical disk 6. Here, the semiconductor laser 1B is a light source for emitting laser light at a wavelength of 780 nm in the near infrared region for CD-R (write-once optical disk), whereas the semiconductor laser 1C is a light source for emitting laser light in the visible region, e.g., at a wavelength of 635 nm, for DVD (digital video disk). By way of a half mirror 1D, one of the laser light beams 2 emitted from the semiconductor lasers 1B and 1C irradiates the half mirror 3. A selector switch 1E is disposed between the LD power supply 1A and the semiconductor lasers 1B and 1C, such that electric power is supplied to one of the semiconductor lasers 1B and 1C as the selector switch 1E is operated.

In the recording area 6A, pits carrying signal information are arranged in a track. Of the laser light beams 2, the reproducing light component reflected from the recording area 6A, in a state carrying the signal information, is made incident on the half mirror 3 by way of the objective lens 5 and collimator lens 4, and then passes through the half mirror 3 so as to enter a photodiode 7 which has been divided into four parts. In the photodiode 7, the respective quantities of light received at positions of the four divided diode parts are operated, so as to yield a data signal and respective error signals for focusing and tracking.

As the half mirror 3 is inserted with an inclination of 45° into the optical path of the light returning from the optical disk 6, it would yield a function equivalent to that of a cylindrical lens. Thus, the light beam passing through the half mirror 3 exhibits astigmatism, whereby the amount of error in focusing would be determined in response to the form of the beam spot of returned light on the four-divided photodiode 7. The collimator lens 4 may be omitted according to circumstances. A diffraction grating may further be inserted between the semiconductor laser 1B, 1C and the half mirror 3, so as to detect tracking errors by means of three beams.

This optical pickup apparatus is constituted such as to be capable of recording and reproducing signals on any optical disk 6 of CD-R and DVD.

While the geometrical thickness values of CD-R and DVD are standardized at 1.2 mm and 0.6 mm, respectively, focusing can securely be effected for any of these optical disks 6.

Both CD-R and DVD have a protective sheet made of PC (polycarbonate; refractive index $n_D$=1.514).

For the CD-R and DVD, the optical system requires different numerical apertures NA, which are set to 0.45 and 0.6, respectively.

Hence, when the same objective lens 5 is used as with this optical pickup apparatus, it is necessary to switch NA, depending on whether CD-R or DVD is recorded/reproduced, to the value corresponding to the recording medium.

Therefore, in this optical pickup apparatus, a diffraction type filter 8 adapted to narrow the luminous flux diameter of the laser light from the light source is placed between the collimator lens 4 and the objective lens 5 only when recording/reproducing CD-R, thereby switching the NA of the optical system in response to the kinds of optical disks 6 to be recorded/reproduced.

Also, in the above-mentioned optical pickup apparatus, the objective lens 5 is designed such that spherical aberration is minimized when employed for recording/reproducing DVD. When it is employed for recording/reproducing CD-R as it is, spherical aberration would be generated by the objective lens due to the difference in thickness between their substrates. Therefore, the diffraction type filter 8 is provided with a light converging function (or light diverging function) which only acts on the laser beam for recording/reproducing CD-R, thus allowing spherical aberration to be corrected when recording/reproducing CD-R as well.

Figure 1:
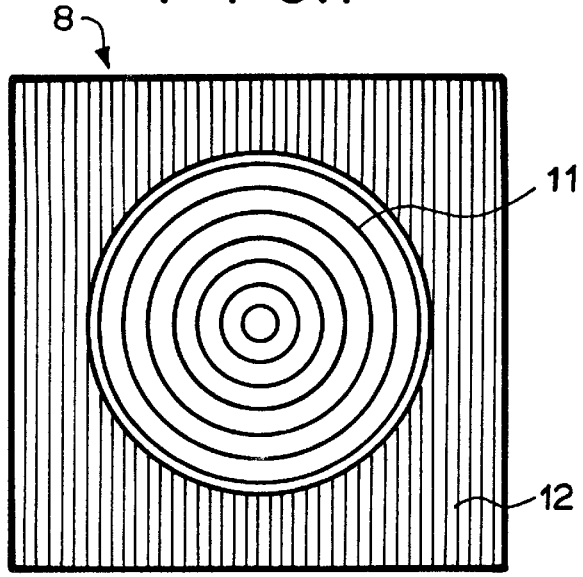
FIG. 1 is a plan view showing a diffraction type filter in accordance with a first embodiment of the present invention.

Namely, as shown in FIG. 1, the diffraction type filter 8 comprises a first region 11 made of a central circular portion, and a second region 12 constituting a marginal portion thereof. The first region 11 is a region provided with a zone plate (concentric circular diffraction grating) having such a wavelength selectivity that light at a wavelength of 635 nm is transmitted therethrough as it is and that light at a wavelength of 780 nm is converged thereby. The second region 12 is formed with a diffraction grating having such a wavelength selectivity that light at a wavelength of 635 nm is transmitted therethrough as it is and that the major part of light at a wavelength of 780 nm is diffracted sideways so as to be substantially blocked out.

Figure 2A:
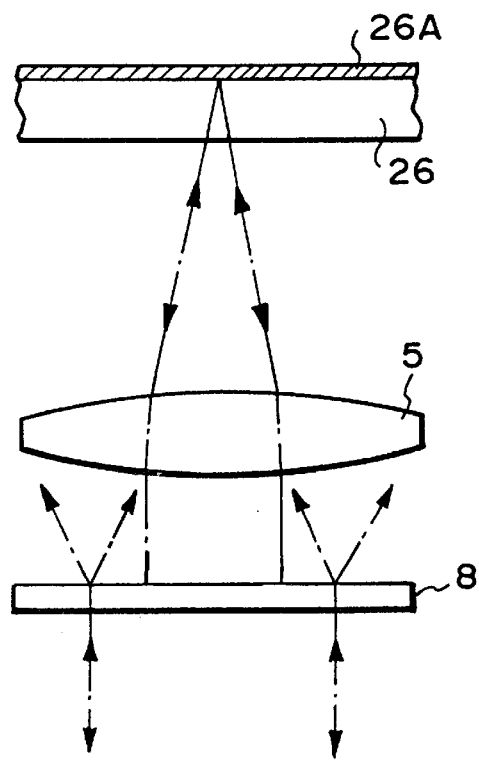
FIGS. 2A and 2B are schematic views for explaining operations of the diffraction type filter shown in FIG. 1.

The operation of the diffraction type filter 8 will now be explained with reference to FIGS. 2A and 2B. Namely, in the case where a CD-R 26 is placed at a predetermined position (on a turntable) so as to be recorded/reproduced as shown in FIG. 2A, the laser light beam 2 at a wavelength of 780 nm from the semiconductor laser 1B would be made incident on the diffraction type filter 8 while being in substantially a parallel light state. Here, since the diameter of the incident laser light beam 2 is set larger than that of the first region 11 in the diffraction type filter 8, the marginal portion of the light beam would be made incident on the second region 12 of the diffraction type filter 8. The marginal portion thus incident on the second region 12 is diffracted sideways on both sides due to the action of the diffraction grating in the second region 12. As a consequence, the laser light beam 2 effectively contributing to recording/reproducing in the recording area 26A of the CD-R 26 is only the part made incident on the first region 11 of the diffraction type filter 8, whereby the beam diameter would be substantially narrowed, thus allowing the numerical aperture NA to decrease.

Of the light beam 2, the center portion incident on the first region 11 is made incident on the objective lens 5 while slightly being converged by the light converging action of the first region 11, and is further converged onto the recording area 26A of the CD-R 26 due to the light converging action of the objective lens 5. Since the objective lens 5 is designed such that no spherical aberration occurs with respect to the DVD 36 having a thickness of 0.6 mm, spherical aberration will with respect to the CD-R 26 having a thickness of 1.2 mm if no measures are provided against it. Due to the light converging action in the first region 11 of the diffraction type filter 8, however, this spherical aberration would be corrected.

Here, the light converging action in the first region 11 with respect to the light at a wavelength of 780 nm is such that the ratio of the 1st-order diffracted light emitted so as to incline toward the center axis of the diffraction type filter 8 is greater than the ratio of 0-order diffracted light.

Figure 2B:
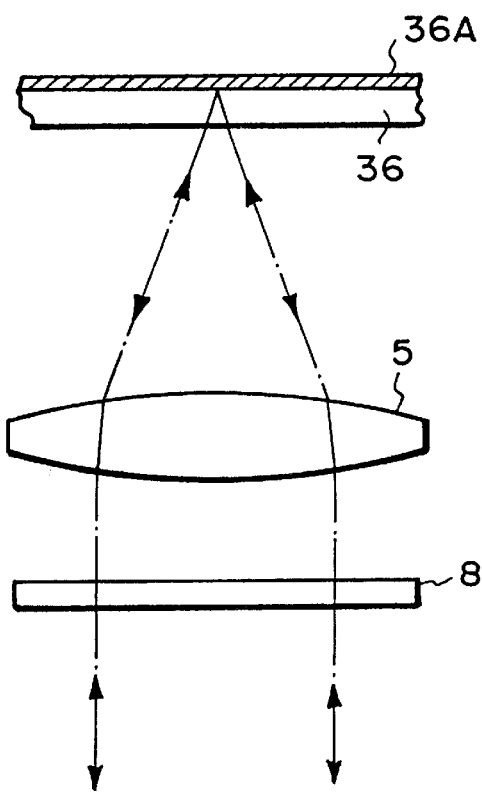

In the case where a DVD 36 is placed at a predetermined position (on a turntable) so as to be recorded/reproduced as shown in FIG. 2B, on the other hand, the laser light beam 2 at a wavelength of 635 nm from the semiconductor laser 1C would be made incident on the diffraction type filter 8 while being in substantially a parallel light state. Here, even though the diameter of the incident laser light beam 2 is set larger than that of the first region 11 in the diffraction type filter 8, the diffraction grating in the second region 12 does not exhibit any diffracting action with respect to the light at a wavelength of 635 nm (the ratio of 0-order diffracted light is substantially 100%), thus allowing the marginal portion of the light beam to pass through the diffraction type filter 8 as it is, whereby the light beam 2 is converged onto the recording area 36A of the DVD 36 without changing its diameter.

Since the zone plate formed in the first region 11 of the diffraction type filter 8 has no light converging action with respect to the light beam at a wavelength of 635 nm (the ratio of 0-order diffracted light is substantially 100%), the center portion of the beam is transmitted through the diffraction type filter 8 as it is, similarly to the marginal portion of the beam, and is converged onto the recording area 36A of the DVD 36 due to the light converging action of the objective lens 5.

Here, the diffracting action in the second region 12 with respect to light at a wavelength of 635 nm is such that the ratio of 0-order diffracted light is substantially 100%, whereas that of the 1st-order and higher diffracted light is substantially 0%.

FIG. 3 shows a sectional configuration of the diffraction type filter 8, in which the first region 11 having a Fresnel zone plate 11A constituted by concentrically arranged annular protrusions, each having one sectional side formed like a step, and the second region 12 having diffraction gratings 12A constituted by long protrusions arranged in parallel at a predetermined pitch, each long protrusion being continuous in one direction and having a rectangular cross section, are formed on a glass substrate 10A.

Each long protrusion with a rectangular cross section has a height identical to the height 3 h of three stages in the step portion of the Fresnel zone plate 11A, and its pitch length is set within the range where a diffraction phenomenon occurs while productivity is favorable, e.g., 10 to 20 μm.

The number of stages of the step portion in the Fresnel zone plate 11A in the first region 11 is set to 3, and each stage height h is set to such a value that the ratio of 1st order diffracted light is made greater for the light at a wavelength of 780 nm used for CD-R and that the ratio of 0-order diffracted light for the light at a wavelength of 635 nm used for DVD is substantially 100%.

Namely, the following conditional expressions (1) and (2) are satisfied:

$$h = L\lambda_1/(n_1-1) \tag{1}$$

$$h = M\lambda_2/(n_2-1) + K\lambda_2/2(n_2-1) \tag{2}$$

where $\lambda_1$ and $\lambda_2$ are the respective wavelengths of the two incident light beams;

$n_1$ is the refractive index of the zone plate or diffraction grating with respect to light having a wavelength of $\lambda_1$;

$n_2$ is the refractive index of the zone plate or diffraction grating with respect to light having a wavelength of $\lambda_2$;

L is a positive integer;

M is the maximum value among 0 and positive integers satisfying a conditional expression of $h > M\lambda_2/(n_2-1)$; and K is a value at least 0.27 but not greater than 0.45 or a value at least 1.55 but not greater than 1.73.

The above-mentioned conditional expression (1) defines a condition for the diffraction efficiency of 0-order diffracted light to become 100% with respect to light at a wavelength of $\lambda_1$ (light at a wavelength of 635 nm for DVD). The abovementioned conditional expression (2), on the other hand, defines a condition, with respect to light at a wavelength of $\lambda_2$ (light at a wavelength of 780 nm for CD), for the diffraction efficiency of +1st-order diffracted light or −1st-order diffracted light in the Fresnel zone plate 11A to become greater than that of 0-order diffracted light and the diffraction efficiency of ±1st-order diffracted light in the linear diffraction gratings 12A to become greater than that of 0-order diffracted light.

Here, the +1st-order diffracted light and −1st-order diffracted light will be defined with reference to FIG. 12. Namely, as depicted, in the Fresnel zone plate 11A having such a step portion, letting the 1st-order diffracted light diffracted so as to incline toward the step side with respect to the light incident direction be +1st-order diffracted light, and the 1st-order diffracted light diffracted so as to incline, contrary thereto, opposite to the step side with respect to the light incident direction be −1st-order diffracted light, the −1st-order diffracted light diffracted toward the outside of the Fresnel zone plate 11A becomes greater when the above-mentioned K is within the range of 0.27 to 0.45, and the +1st-order diffracted light diffracted toward the inside of the Fresnel zone plate 11A becomes greater when the abovementioned K is within the range of 1.55 to 1.73.

Thus, as the cross section of the Fresnel zone plate 11A is not shaped into a simple rectangle but a form having one side provided with a step-like portion, one of ±1st-order diffracted light components can be outputted alone when the value of the above-mentioned K is appropriately set. Thus, light at a wavelength of $\lambda_2$ would become converged light when incident on the objective lens 5, as setting is made such as to output the +1st-order diffracted light (by setting $1.55 \leq K \leq 1.73$) in the diffraction type filter 8A shown in FIG. 3 having step portions of the Fresnel zone plate 11A arranged to face inward, or as setting is made such as to output the −1st-order diffracted light (by setting $0.27 \leq K \leq 0.45$) in the diffraction type filter 8B shown in FIG. 4 having step portions arranged to face outward. FIG. 4 shows a second embodiment of the zone plate 11 on glass substrate 10B.

Figure 5:
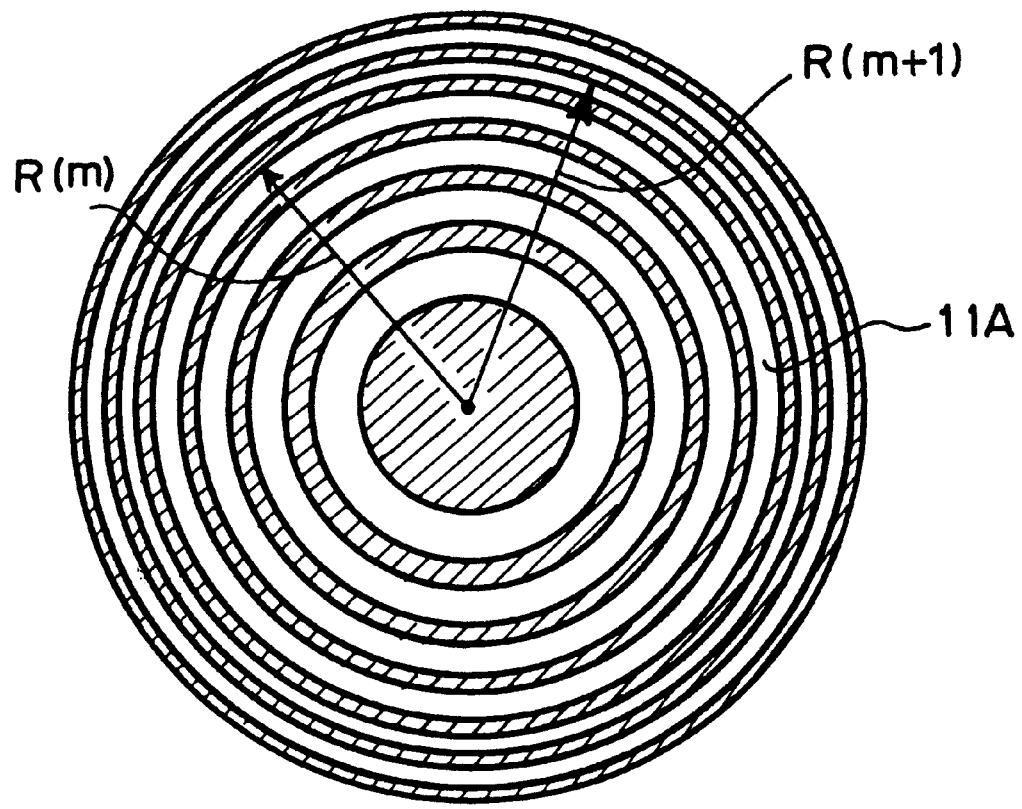
FIG. 5 is a schematic plan view showing the configuration of the Fresnel zone plate in the first region shown in FIG. 1.

FIG. 5 is a schematic view showing that the Fresnel zone plate 11A in the first region 11 is formed like concentric circles. As mentioned above, the Fresnel zone plate 11A is used for eliminating the spherical aberration occurring due to the difference in thickness between the substrates of DVD and CD-R, and its characteristic is appropriately selected depending on the distance between the diffraction type filter 8A and the objective lens 5, and the characteristic of the objective lens 5.

For example, the radius $R_m$ of m-th annular band of the zone plate 11A is represented by the following conditional expression (8):

$$R_m = [\lambda_2 m(2f + \lambda_2 m)]^{1/2} \tag{8}$$

where m=0, 1, 2, . . . , n;

f is the focal length of the zone plate; and n is the number satisfying a conditional expression of $R_n = (\frac{1}{2})\phi$ ($\phi$ being the beam diameter of a light beam effectively contributing to recording/reproducing in light at a wavelength of 780 nm.)

FIG. 6 shows how the ratio between 0-order diffracted light and ±1st-order diffracted light changes according to the value of K when the above-mentioned conditional expression (2) is used. It indicates that, within the ranges of $0.27 \leq K \leq 0.45$ and $1.55 \leq K \leq 1.73$, the ratio of +1st-order diffracted light or −1st-order diffracted light in the Fresnel zone plate 11A is not smaller than that of 0-order diffracted light, and the ratio of ±1st-order diffracted light in the linear diffraction grating 12A is not smaller than that of 0-order diffracted light.

Thus, when K is set to an appropriate value in the diffraction grating 12A with respect to the light for recording/reproducing CD-R incident thereon from the rear side of the diffraction type filter 8, the diffraction efficiency of ±1st-order diffracted light becomes greater than that of 0-order diffracted light in the second region 12, whereby the luminous flux diameter can substantially be reduced, and the converged light can be attained in the first region 11 so as to eliminate the spherical aberration caused by the objective lens 5.

The Fresnel zone plate 11A and diffracting grating 12A are formed as titanium dioxide ($TiO_2$) is deposited on the glass substrate 10A. Titanium dioxide exhibits a refractive index of 2.349 for light at a wavelength of 635 nm and a refractive index of 2.299 for light at a wavelength of 780 nm.

Figure 8:
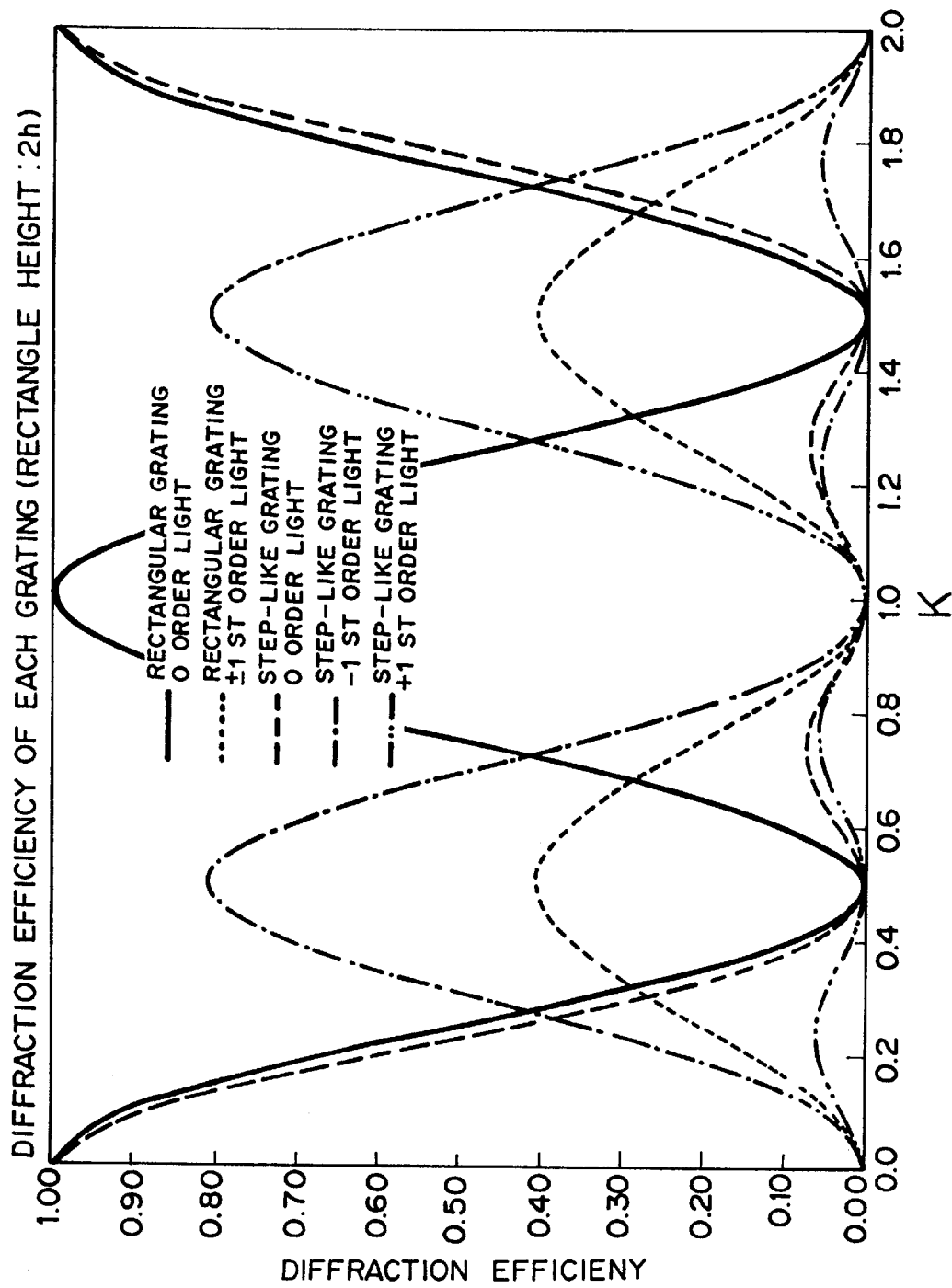
FIG. 8 is a graph showing the diffraction efficiency of the diffraction type filter shown in FIG. 7.

FIG. 7 shows the second embodiment of the diffraction type filter in accordance with the present invention (diffraction type filter 8C), in which the height of the linear diffraction grating 12B corresponds to the height 2 h of two stages of the step portion in the Fresnel zone plate 11A. The diffraction efficiency of each diffracted light component in this case is represented by a graph such as that shown in FIG. 8. Consequently, in order to obtain effects similar to those of the abovementioned first embodiment, the value of the above-mentioned K is set to at least 1.32 but not greater than 1.68 in order for the diffraction efficiency of +1st-order diffracted light to become greater in the first region 11 in the case where the step portions of the Fresnel zone plate 11A formed on the glass substrate 10C are arranged to face inward as shown in FIG. 7, whereas the value of the above-mentioned K is set to at least 0.32 but not greater than 0.68 in order for the diffraction efficiency of −1st-order diffracted light to become greater in the first region 11 in the case where the step portions of the Fresnel zone plate 11A are arranged to face outward.

Figure 10:
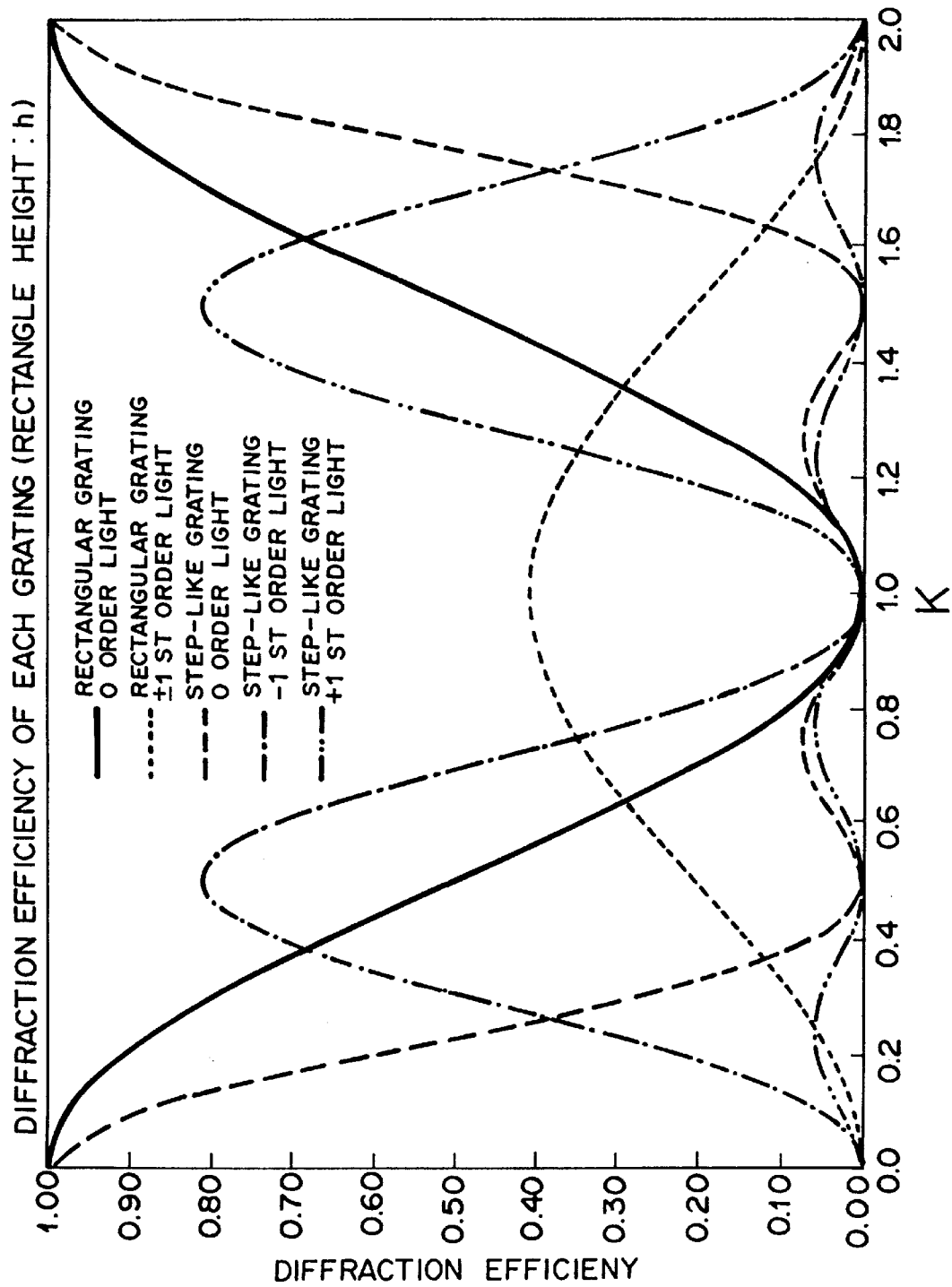
FIG. 10 is a graph showing the diffraction efficiency of the diffraction type filter shown in FIG. 9.

FIG. 9 shows the third embodiment of the diffraction type filter in accordance with the present invention (diffraction type filter 8D), in which the height of the linear diffraction grating 12C corresponds to the height h of one stage of the step portion in the Fresnel zone plate 11A. The diffraction efficiency of each diffracted light component in this case is represented by a graph such as that shown in FIG. 10. Consequently, in order to obtain effects similar to those of the above-mentioned embodiments, the value of the above-mentioned K is set to at least 0.64 but not greater than 0.77 in order for the diffraction efficiency of −1st-order diffracted light to become greater in the first region 11 in the case where the step portions of the Fresnel zone plate 11A formed on the glass substrate 10D are arranged to face outward as shown in FIG. 9, whereas the value of the above-mentioned K is set to at least 1.23 but not greater than 1.36 in order for the diffraction efficiency of +1st-order diffracted light to become greater in the first region 11 in the case where the step portions of the Fresnel zone plate 11A are arranged to face inward.

The sizes of the beam diameters of two laser light beams 2 having different wavelengths at the time when they are incident on the diffraction type grating 8, 8A, 8B, 8C, 8D may appropriately be set as long as their diameters are greater than the diameter of the first region 11.

Without being restricted to the above-mentioned embodiments, the diffraction type filter in accordance with the present invention can be modified in various manners. For example, plastic materials may be used as a material for forming the substrate, whereas various other materials such as metals, metal oxides, and nonmetallic materials may be used as a material for forming the diffraction grating and zone plate. Also, the substrate, diffraction grating, and zone plate may be integrally molded from plastics.

Though the above-mentioned embodiments are configured such that one of luminous fluxes is converged by a zone plate, the value of K may be changed in each embodiment, depending on the aberration to be corrected, such that the diffraction efficiencies of the +1st-order diffracted light and −1st-order diffracted light are interchanged, thereby causing the light emitted from the zone plate to become divergent light as well.

Also, though a diffraction grating having a rectangular cross section is disposed in the second zone, the present invention should not be restricted to such a form. Any form may be used as long as the incident light can be diffracted sideways such that it does not substantially contribute to recording/reproducing. For example, it may have both or one of sectional sides formed like a step.

The number of stages of the step can also be set to 2 or 4 or more.

The technique of forming the diffraction grating and zone plate is not restricted to deposition, but various techniques such as sputtering, plating, and roll coating may be used as well.

When the present invention is applied to an optical pickup apparatus, the optical recording media to be recorded/reproduced are not limited to DVD and CD-R. The present invention is also applicable to any case where two types of optical recording media which are different from each other in their specifications of usable wavelength region and NA are recorded/reproduced by means of a common optical pickup apparatus.

Further, the value of L in the above-mentioned conditional expressions (1), (3) and (5) may be set to a value different from integers within the range not problematic in practice, such that K is set to a value indicated in any of the abovementioned embodiments.

In the following, the diffraction type filter in accordance with the present invention will further be explained with reference to Examples employing specific values.

EXAMPLE 1

The material for forming the diffraction grating and zone plate was titanium dioxide ($TiO_2$), whereas the wavelength $\lambda_1$ of light irradiating DVD was set to 635 nm. As a consequence, the refractive index $n_1$ of titanium dioxide with respect to this light became 2.349. The zone plate had one sectional side formed like a step, and the number of stages was 3. On the other hand, the diffraction grating had a rectangular cross section, and its height corresponded to the stage height 3 h of three stages of the step portion. Letting L=13 in the above-mentioned conditional expression (1), the stage height h of one stage of the step portion became 6.11935 μm.

Here, letting the wavelength $\lambda_2$ of light irradiating CD-R be 780 nm, the refractive index of titanium dioxide with respect to this light was 2.299.

Also, in this case, M=10 and K=0.382 in the above-mentioned conditional expression (2).

Here, the diffraction efficiency for the light at a wavelength of 635 nm was such that the ratio of 0-order diffracted light was 100%.

For the light at a wavelength of 780 nm, the ratio of 0-order diffracted light and that of −1st-order diffracted light were 8.9% and 68.1%, respectively, in the first region 11, whereas the ratio of 0-order diffracted light and that of ±1st-order diffracted light were 5.2% and 38.4%, respectively, in the second region 12.

EXAMPLE 2

Though the forms, and material of the diffraction grating and zone plate, the wavelength $\lambda_1$ of light irradiating DVD, and the refractive index $n_1$ of the material were the same as those in Example 1, L=4 was set in the above-mentioned conditional expression (1). As a consequence, the stage height h of one stage of the step portion became 1.88288 μm.

Letting the wavelength $\lambda_2$ of light irradiating CD-R be the same as that in Example 1, M=3 and K=0.271 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light and that of −1st-order diffracted light were 35.9% and 40.3%, respectively, in the first region 11, whereas the ratio of 0-order diffracted light and that of ±1st-order diffracted light were 8.3% and 37.2%, respectively, in the second region 12.

EXAMPLE 3

Though the forms, and material of the diffraction grating and zone plate, the wavelength $\lambda_1$ of light irradiating DVD, and the refractive index $n_1$ of the material were the same as those in Example 1, L=1 was set in the above-mentioned conditional expression (1). As a consequence, the stage height h of one stage of the step portion became 0.47072 μm.

Letting the wavelength $\lambda_2$ of light irradiating CD-R be the same as that in Example 1, M=0 and K=1.568 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light and that of +1st-order diffracted light were 2.7% and 76.6%, respectively, in the first region 11, whereas the ratio of 0-order diffracted light and that of ±1st-order diffracted light were 20.2% and 32.4%, respectively, in the second region 12.

EXAMPLE 4

Though the forms, and material of the diffraction grating and zone plate, the wavelength $\lambda_1$ of light irradiating DVD, and the refractive index $n_1$ of the material were the same as those in Example 1, L=10 was set in the above-mentioned conditional expression (1). As a consequence, the stage height h of one stage of the step portion became 4.70719 μm.

Letting the wavelength $\lambda_2$ of light irradiating CD-R be the same as that in Example 1, M=7 and K=1.679 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light and that of +1st-order diffracted light were 21.7% and 53.7%, respectively, in the first region 11, whereas the ratio of 0-order diffracted light and that of ±1st-order diffracted light were 0.3% and 40.4%, respectively, in the second region 12.

EXAMPLE 5

Though the forms, heights, and material of the diffraction grating and zone plate, the wavelength $\lambda_1$ of light irradiating DVD, and the refractive index $n_1$ of the material were the same as those in Example 1, the height of the diffraction grating was set to the stage height 2 h of two stages in the step portion, and L=8 was set in the above-mentioned conditional expression (3). As a consequence, the stage height h of one stage of the step portion became 3.76575 μm.

Letting the wavelength $\lambda_2$ of light irradiating CD-R be the same as that in Example 1, M=6 and K=0.543 in conditional expression (4).

Here, the diffraction efficiency for the light at a wavelength of 635 nm was such that the ratio of 0-order diffracted light was 100%.

For the light at a wavelength of 780 nm, the ratio of 0-order diffracted light and that of −1st-order diffracted light were 0.8% and 79.3%, respectively, in the first region 11, whereas the ratio of 0-order diffracted light and that of ±1st-order diffracted light were 1.8% and 39.8%, respectively, in the second region 12.

EXAMPLE 6

Though the forms, and material of the diffraction grating and zone plate, the wavelength $\lambda_1$ of light irradiating DVD, and the refractive index $n_1$ of the material were the same as those in Example 5, L=13 was set in the above-mentioned conditional expression (3). As a consequence, the stage height h of one stage of the step portion became 6.11935 μm.

Letting the wavelength $\lambda_2$ of light irradiating CD-R be the same as that in Example 5, M=10 and K=0.382 in conditional expression (4).

Here, the diffraction efficiency for the light at a wavelength of 635 nm was such that the ratio of 0-order diffracted light was 100%.

For the light at a wavelength of 780 nm, the ratio of 0-order diffracted light and that of −1st-order diffracted light were 8.9% and 68.1%, respectively, in the first region 11, whereas the ratio of 0-order diffracted light and that of ±1st-order diffracted light were 13.1% and 35.2%, respectively, in the second region 12.

EXAMPLE 7

Though the forms, and material of the diffraction grating and zone plate, the wavelength $\lambda_1$ of light irradiating DVD, and the refractive index $n_1$ of the material were the same as those in Example 5, L=15 was set in the above-mentioned conditional expression (3). As a consequence, the stage height h of one stage of the step portion became 7.06079 μm.

Letting the wavelength $\lambda_2$ of light irradiating CD-R be the same as that in Example 5, M=11 and K=1.518 in conditional expression (4).

Here, the diffraction efficiency for the light at a wavelength of 635 nm was such that the ratio of 0-order diffracted light was 100%.

For the light at a wavelength of 780 nm, the ratio of 0-order diffracted light and that of +1st-order diffracted light were 0.2% and 80.8%, respectively, in the first region 11, whereas the ratio of 0-order diffracted light and that of ±1st-order diffracted light were 0.3% and 40.4%, respectively, in the second region 12.

EXAMPLE 8

Though the forms, and material of the diffraction grating and zone plate, the wavelength $\lambda_1$ of light irradiating DVD, and the refractive index $n_1$ of the material were the same as those in Example 5, L=20 was set in the above-mentioned conditional expression (3). As a consequence, the stage height h of one stage of the step portion became 9.41438 μm.

Letting the wavelength $\lambda_2$ of light irradiating CD-R be the same as that in Example 5, M=15 and K=1.357 in conditional expression (4).

Here, the diffraction efficiency for the light at a wavelength of 635 nm was such that the ratio of 0-order diffracted light was 100%.

For the light at a wavelength of 780 nm, the ratio of 0-order diffracted light and that of +1st-order diffracted light were 5.3% and 62.6%, respectively, in the first region 11, whereas the ratio of 0-order diffracted light and that of ±1st-order diffracted light were 18.8% and 32.9%, respectively, in the second region 12.

EXAMPLE 9

Though the forms, heights, and material of the diffraction grating and zone plate, the wavelength $\lambda_1$ of light irradiating DVD, and the refractive index $n_1$ of the material were the same as those in Example 1, the height of the diffraction grating was set to the stage height h of one stage in the step portion, and L=3 was set in the above-mentioned conditional expression (5). As a consequence, the stage height h of one stage of the step portion became 1.41216 μm.

Letting the wavelength $\lambda_2$ of light irradiating CD-R be the same as that in Example 1, M=2 and K=0.704 in conditional expression (6).

Here, the diffraction efficiency for the light at a wavelength of 635 nm was such that the ratio of 0-order diffracted light was 100%.

For the light at a wavelength of 780 nm, the ratio of 0-order diffracted light and that of −1st-order diffracted light were 7.2% and 47.1%, respectively, in the first region 11, whereas the ratio of 0-order diffracted light and that of ±1st-order diffracted light were 20.2% and 32.4%, respectively, in the second region 12.

EXAMPLE 10

Though the forms, and material of the diffraction grating and zone plate, the wavelength $\lambda_1$ of light irradiating DVD, and the refractive index $n_1$ of the material were the same as those in Example 9, L=17 was set in the above-mentioned conditional expression (5). As a consequence, the stage height h of one stage of the step portion became 8.00222 μm.

Letting the wavelength $\lambda_2$ of light irradiating CD-R be the same as that in Example 9, M=13 and K=0.654 in conditional expression (6).

Here, the diffraction efficiency for the light at a wavelength of 635 nm was such that the ratio of 0-order diffracted light was 100%.

For the light at a wavelength of 780 nm, the ratio of 0-order diffracted light and that of −1st-order diffracted light were 5.8% and 60.0%, respectively, in the first region 11, whereas the ratio of 0-order diffracted light and that of ±1st-order diffracted light were 26.8% and 29.7%, respectively, in the second region 12.

EXAMPLE 11

Though the forms, and material of the diffraction grating and zone plate, the wavelength $\lambda_1$ of light irradiating DVD, and the refractive index $n_1$ of the material were the same as those in Example 9, L=11 was set in the above-mentioned conditional expression (5). As a consequence, the stage height h of one stage of the step portion became 5.17791 μm.

Letting the wavelength $\lambda_2$ of light irradiating CD-R be the same as that in Example 9, M=8 and K=1.246 in conditional expression (6).

Here, the diffraction efficiency for the light at a wavelength of 635 nm was such that the ratio of 0-order diffracted light was 100%.

For the light at a wavelength of 780 nm, the ratio of 0-order diffracted light and that of +1st-order diffracted light were 7.3% and 33.7%, respectively, in the first region 11, whereas the ratio of 0-order diffracted light and that of ±1st-order diffracted light were 14.3% and 34.8%, respectively, in the second region 12.

EXAMPLE 12

Though the forms, and material of the diffraction grating and zone plate, the wavelength $\lambda_1$ of light irradiating DVD, and the refractive index $n_1$ of the material were the same as those in Example 9, L=20 was set in the above-mentioned conditional expression (5). As a consequence, the stage height h of one stage of the step portion became 9.41438 μm.

Letting the wavelength $\lambda_2$ of light irradiating CD-R be the same as that in Example 9, M=15 and K=1.357 in conditional expression (6).

Here, the diffraction efficiency for the light at a wavelength of 635 nm was such that the ratio of 0-order diffracted light was 100%.

For the light at a wavelength of 780 nm, the ratio of 0-order diffracted light and that of +1st-order diffracted light were 5.3% and 62.6%, respectively, in the first region 11, whereas the ratio of 0-order diffracted light and that of ±1st-order diffracted light were 28.3% and 29.1%, respectively, in the second region 12.

As explained in the foregoing, in the diffraction type filter in accordance with the present invention, a diffraction grating, having a wavelength selectivity, constituted by a plurality of protrusions arranged in parallel at a predetermined pitch, each being continuous in one direction, is disposed at a marginal region of the filter, such as to diffract sideways only a wavelength of light whose luminous flux diameter is to be narrowed.

As a consequence, of the light irradiating this diffraction type filter, a wavelength of light whose luminous flux diameter is not needed to be narrowed is transmitted therethrough with its luminous flux diameter unchanged, thereby maintaining the NA of the optical system at a large value. On the other hand, for a wavelength of light whose luminous flux diameter is to be narrowed, only the luminous flux portion irradiating the center part of the filter is transmitted therethrough, so as to narrow the luminous flux diameter, thus allowing the optical system to have a smaller value of NA.

Also, in this diffraction type filter, a center region of the filter is provided with a zone plate, having a wavelength selectivity, constituted by protrusions, each having a step-like cross section, formed like concentric circles. As a consequence, aberration is corrected for only the light in which the aberration caused by the convergent lens is to be corrected. Therefore, in the case where a common convergent lens is used for at least two kinds of optical recording media whose substrates have thicknesses different from each other, the signal of each optical recording medium can be recorded/reproduced in the state where aberration is corrected.

Further, when one sectional side of the zone plate is formed like a step, one of ±1st-order diffracted light components can be outputted alone. Therefore, depending on the combination of the facing direction of the step portion and which one of ±1st-order diffracted light components is selected, a lens action having a desired power can be yielded, thus allowing an aberration correcting function to be attained easily.

Hence, in the optical pickup apparatus commonly used for DVD and CD-R in which it is necessary to switch the size of NA, the present invention taking account of the fact that the wavelengths of light to be used for the respective optical recording media are different from each other is quite effectively employed. Namely, NA can be switched so as to correspond to each optical recording medium when the diffraction type filter in accordance with the present invention is simply inserted at a predetermined position, while substantially using the configuration of the conventional optical pickup apparatus. Consequently, without necessitating an electric control system for controlling a liquid crystal panel, which is required when changing the luminous flux diameter by means of a liquid crystal shutter, the manufacturing cost can be reduced. Also, there is no risk of the direction of vibration of irradiation light being restricted such as to lower the degree of flexibility in designing. Further, noise can be reduced.

Also, the aberration generated due to the difference in thickness between the substrates of optical recording media can easily be corrected. Hence, the practical value of the present invention is quite high.

What is claimed is:

1. A diffraction type filter, having a wavelength selectivity, disposed in a luminous flux; said filter comprising a first region constituting a center portion of said filter, and a second region positioned outside the center portion of said filter, said first region being formed with a zone plate having an aberration correcting function for only one of two light beams respectively having wavelengths of $\lambda_1$ and $\lambda_2$ which are different from each other, said second region being formed with a diffraction grating substantially having a light shielding function for only one of said two light beams respectively having wave lengths of $\lambda_1$ and $\lambda_2$, wherein said diffraction grating is constituted by a plurality of protrusions, each having a height corresponding to a height 3 h of three stages of a step portion forming said zone plate, the height h of one stage of said step portion forming said zone plate, the height h of one stage of said step portion satisfying the following conditional expressions:

$$h=L\lambda_1/(n_1-1)$$

$$h=M\lambda_2/(n_2-1)+K\lambda_2/2(n_2-1)$$

where $\lambda_1$ and $\lambda_2$ are the respective wavelengths of the two incident light beams;

$n_1$ is the refractive index of the zone plate or diffraction grating with respect to light having the wavelength of $\lambda_1$;

$n_2$ is the refractive index of the zone plate or diffraction grating with respect to light having the wavelength of $\lambda_2$;

L is a positive integer;

M is the maximum value among 0 and positive integers satisfying a conditional expression of $h>M\lambda_2/(n_2-1)$; and K is a value at least 0.27 but not greater than 0.45 or a value at least 1.55 but not greater than 1.73.

2. A diffraction type filter according to claim 1, wherein the luminous flux incident on said diffraction type filter is substantially a parallel luminous flux.

3. A diffraction type filter, having a wavelength selectivity, disposed in a luminous flux; said filter comprising a first region constituting a center portion of said filter, and a second region positioned outside the center portion of said filter, said first region being formed with a zone plate having an aberration correcting function for only one of two light beams respectively having wavelengths of $\lambda_1$ and $\lambda_2$ which are different from each other, said second region being formed with a diffraction grating substantially having a light shielding function for only one of said two light beams respectively having wave lengths of $\lambda_1$ and $\lambda_2$, wherein said zone plate is constituted by a plurality of continuous protrusions arranged like concentric circles, each protrusion being continuous and having one sectional side formed like a step, wherein said zone plate is a Fresnel zone plate, m-th radius $R_m$ of said zone plate being represented by the following conditional expression:

$$R_m=\{\lambda_i m(2f+\lambda_i m)\}^{1/2}$$

where m=0, 1, 2, . . . , n;

$\lambda_i$ is $\lambda_1$ or $\lambda_2$;

f is the focal length of the zone plate; and n is a number satisfying a conditional expression of $R_n=(½)\phi$;

wherein $\phi$ being a beam diameter of a light beam effectively contributing to recording/reproducing in light whose aberration is corrected by the zone plate.

4. A diffraction type filter according to claim 3, wherein a number of stages in the step portion forming said zone plate is 3.

5. A diffraction type filter according to claim 3, wherein said diffraction type filter is disposed in front of a convergent lens for converging said luminous flux.

6. A diffraction type filter according to claim 5, wherein said luminous flux is converged at a position where at least two kinds of optical recording media are placed, at least one of at least two kinds of optical media being recorded or reproduced with the light beam having the wavelength of $\lambda_1$, the rest being recorded or reproduced with the light beam having the wavelength of $\lambda_2$ different from said wavelength of $\lambda_1$, said zone plate correcting an aberration caused by a difference in thickness between said optical recording media for only one of said two light beams having different wavelengths, said diffraction grating diffracting only one of said two light beams having different wavelengths into a direction different from a light-converging direction of said convergent lens.

7. A diffraction type filter, having a wavelength selectivity, disposed in a luminous flux; said filter comprising a first region constituting a center portion of said filter, and a second region positioned outside the center portion of said filter, said first region being formed with a zone plate having an aberration correcting function for only one of two light beams respectively having wavelengths of $\lambda_1$ and $\lambda_2$ which are different from each other, said second region being formed with a diffraction grating substantially having a light shielding function for only one of said two light beams respectively having wavelengths of $\lambda_1$ and $\lambda_2$;

said diffraction grating being constituted by a plurality of protrusions, each having a height corresponding to a height 2 h of two stages of a step portion forming said zone plate, the height h of one stage of said step portion satisfying the following conditional expressions:

$$h = L\lambda_1/(n_1-1)$$

$$h = M\lambda_2/(n_2-1) + K\lambda_2/2(n_2-1)$$

where $\lambda_1$ and $\lambda_2$ are the respective wavelengths of the two incident light beams;

$n_1$ is the refractive index of the zone plate or diffraction grating with respect to light having the wavelength of $\lambda_1$;

$n_2$ is the refractive index of the zone plate or diffraction grating with respect to light having the wavelength of $\lambda_2$;

L is a positive integer;

M is a maximum value among 0 and positive integers satisfying a conditional expression of $h > M\lambda_2/(n_2-1)$; and K is a value at least 0.32 but not greater than 0.68 or a value at least 1.32 but not greater than 1.68.

8. A diffraction type filter according to claim 7, wherein the luminous flux incident on said diffraction type filter is substantially a parallel luminous flux.

9. A diffraction type filter according to claim 7, wherein said zone plate is constituted by a plurality of continuous protrusions arranged like concentric circles, each protrusion being continuous and having one sectional side formed like a step.

10. A diffraction type filter according to claim 9, wherein said zone plate is a Fresnel zone plate, m-th radius $R_m$ of said zone plate being represented by the following conditional expression:

$$R_m = [\lambda_i m(2f + \lambda_i m)]^{1/2}$$

where m = 0, 1, 2, ..., n;

$\lambda_i$ is $\lambda_1$ or $\lambda_2$;

f is the focal length of the zone plate; and n is a number satisfying a conditional expression of $R_n = (\frac{1}{2})\phi$ ($\phi$ being a beam diameter of a light beam effectively contributing to recording/reproducing in light whose aberration is corrected by the zone plate.)

11. A diffraction type filter according to claim 9, wherein the number of stages in the step portion forming said zone plate is 3.

12. A diffraction type filter according to claim 7, wherein said diffraction type filter is disposed in front of a convergent lens for converging said luminous flux.

13. A diffraction type filter according to claim 12, wherein said luminous flux is converged at a position where at least two kinds of optical recording media are placed, at least one of at least two kinds of optical media being recorded or reproduced with the light beam having the wavelength of $\lambda_1$, the rest being recorded or reproduced with the light beam having the wavelength of $\lambda_2$ different from said wavelength of $\lambda_1$, said zone plate correcting an aberration caused by a difference in thickness between said optical recording media for only one of said two light beams having different wavelengths, said diffraction grating diffracting only one of said two light beams having different wavelengths into the direction different from the light-converging direction of said convergent lens.

14. A diffraction type filter, having a wavelength selectivity, disposed in a luminous flux; said filter comprising a first region constituting a center portion of said filter, and a second region positioned outside the center portion of said filter, said first region being formed with a zone plate having an aberration correcting function for only one of two light beams respectively having wavelengths of $\lambda_1$ and $\lambda_2$ which are different from each other, said second region being formed with a diffraction grating substantially having a light shielding function for only one of said two light beams respectively having wavelengths of $\lambda_1$ and $\lambda_2$;

said diffraction grating being constituted by a plurality of protrusions, each having a height corresponding to a height h of one stage of a step portion forming said zone plate, the height h of one stage of said step portion satisfying the following conditional expressions:

$$h = L\lambda_1/(n_1-1)$$

$$h = M\lambda_2/(n_2-1) + K\lambda_2/2(n_2-1)$$

where $\lambda_1$ and $\lambda_2$ are the respective wavelengths of the two incident light beams;

$n_1$ is the refractive index of the zone plate or diffraction grating with respect to light having the wavelength of $\lambda_1$;

$n_2$ is the refractive index of the zone plate or diffraction grating with respect to light having the wavelength of $\lambda_2$;

L is a positive integer;

M is a maximum value among 0 and positive integers satisfying a conditional expression of $h > M\lambda_2/(n_2-1)$; and K is a value at least 0.64 but not greater than 0.77 or a value at least 1.23 but not greater than 1.36.

15. A diffraction type filter according to claim 14, wherein the luminous flux incident on said diffraction type filter is substantially a parallel luminous flux.

16. A diffraction type filter according to claim 14, wherein said zone plate is constituted by a plurality of continuous protrusions arranged like concentric circles, each protrusion being continuous and having one sectional side formed like a step.

17. A diffraction type filter according to claim 16, wherein said zone plate is a Fresnel zone plate, m-th radius $R_m$ of said zone plate being represented by the following conditional expression:

$$R_m = [\lambda_i m(2f + \lambda_i m)]^{1/2}$$

where m=0, 1, 2, ..., n;

$\lambda_i$ is $\lambda_1$ or $\lambda_2$;

f is the focal length of the zone plate; and n is a number satisfying a conditional expression of $R_n = (\frac{1}{2})\phi$ ($\phi$ being a beam diameter of a light beam effectively contributing to recording/reproducing in light whose aberration is corrected by the zone plate.)

18. A diffraction type filter according to claim 16, wherein the number of stages in the step portion forming said zone plate is 3.

19. A diffraction type filter according to claim 14, wherein said diffraction type filter is disposed in front of a convergent lens for converging said luminous flux.

20. A diffraction type filter according to claim 19, wherein said luminous flux is converged at a position where at least two kinds of optical recording media are placed, at least one of at least two kinds of optical media being recorded or reproduced with the light beam having the wavelength of $\lambda_1$, the rest being recorded or reproduced with the light beam having the wavelength of $\lambda_2$ different from said wavelength of $\lambda_1$, said zone plate correcting an aberration caused by a difference in thickness between said optical recording media for only one of said two light beams having different wavelengths, said diffraction grating diffracting only one of said two light beams having different wavelengths into a direction different from a light-converging direction of said convergent lens.

\* \* \* \* \*

UNITED STATES PATENT AND TRADEMARK OFFICE
CERTIFICATE OF CORRECTION

PATENT NO.   : 6,166,854
DATED        : December 26, 2000
INVENTOR(S)  : Toshiaki Katsuma Page 1 of 1

It is certified that error appears in the above-identified patent and that said Letters Patent is hereby corrected as shown below:

Column 16, claim 1,
Line 14, please delete "$X_2$" and substitute therefore -- $\lambda_2$ --.

Signed and Sealed this

Ninth Day of October, 2001

*Attest:*

*Nicholas P. Godici*

*Attesting Officer*

NICHOLAS P. GODICI
*Acting Director of the United States Patent and Trademark Office*